United States Patent [19]

Bloch

[11] Patent Number: 4,462,551
[45] Date of Patent: Jul. 31, 1984

[54] RETRACTIBLE FLY TYING BOBBIN

[76] Inventor: Paul Bloch, 109 Greenvillage St., Moodus, Conn. 06469

[21] Appl. No.: 407,899

[22] Filed: Aug. 13, 1982

[51] Int. Cl.³ .................... B65H 49/06; B65H 81/00; A01K 81/00
[52] U.S. Cl. ........................................ 242/7.19; 43/1; 57/10; 242/129.3; 242/129.8
[58] Field of Search ................. 242/7.06, 7.19, 1, 107, 242/107.5, 129.1, 129.3, 129.5, 129.8; 57/10; 43/1

[56] References Cited

U.S. PATENT DOCUMENTS

| | | | |
|---|---|---|---|
| 460,723 | 10/1891 | Eisenhart | 242/129.3 |
| 2,220,878 | 11/1940 | Harvey | 242/7.19 |
| 2,338,353 | 1/1944 | Perkins | 242/7.19 |

*Primary Examiner*—Billy S. Taylor
*Attorney, Agent, or Firm*—Alan E. Steele

[57] ABSTRACT

An improved retractible fly tying bobbin having means for maintaining tension on the thread while tying the fly and also means for quickly relieving all the tension on the thread when the tying is completed. The bobbin is compact and utilizes two cupped shaped cylindrical halves which engage each other in a drive fit, wherein one cylindrical half is driven and the other half is the driver, tension on the thread can be adjusted prior to assembly of the bobbin to keep the thread taught while winding without causing the thread to break.

7 Claims, 4 Drawing Figures

RETRACTIBLE FLY TYING BOBBIN

This invention relates to a fly tying bobbin which has a thread dispenser which maintains tension on the thread as the fly is being tied. The tying of flies for fishing is an art in which considerable skill is required. The bobbin for tying flies is used as a tool for the fast and efficient operation of tying in and tying off various countless materials used in the construction of a fly. In order to duplicate a natural insect, using artificial material in the tying process, as many as 15 different materials such as thread, wool, tinsel, fur, feathers, etc. may be required in the construction of one fly. Each of these materials must be tied in and then wound on hook, and tied off to fly hook with thread dispensed by bobbin. All current bobbins must be manually unwound and manually retracted. A slow inefficient and boring process, many times the tension which must be maintained in order to tie off, is relaxed and the material being tied jumps apart. My present invention over comes these drawbacks by providing means for automatic, fast continuous tension and retraction. This bobbin also saves approximately 50% or better of the time it will take to complete one fly.

In view of the above, the main object of this invention is to provide a fly tying bobbin which will dispense thread under tension and retract thread under tension automatically, as needed, during the fly tying process.

Another object is to provide a fly tying bobbin which can vary the tension on the thread being dispensed.

Still another object is to provide a fly tying bobbin which will instantaneously relieve the tension on the thread being dispensed.

Yet another object of this invention is to provide a fly tying bobbin which can be easily adjusted and controlled.

Other features and many of the attendant advantages of this invention will be readily appreciated as the invention becomes better understood from the following description taken in connection with the illustrative embodiments in the accompanying drawings wherein.

Figure 1:
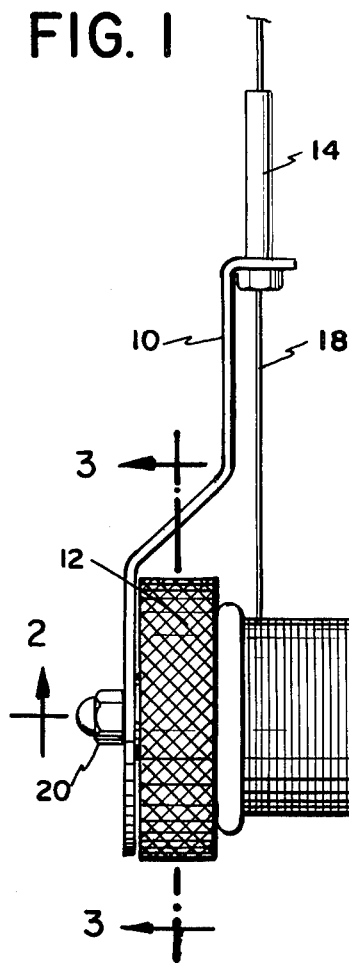
FIG. 1 shows an assembled fly tying bobbin with a thread spool mounted thereon.
Figure 3:
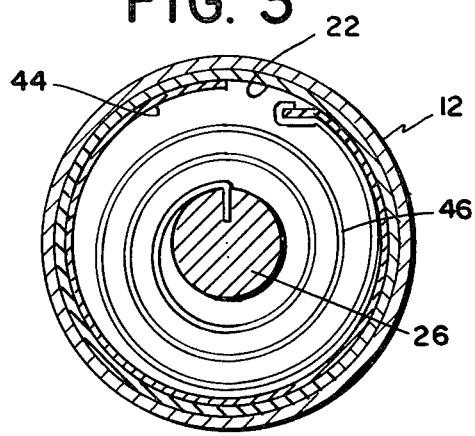
FIG. 3 shows a section through the clutch housing.
Figure 2:
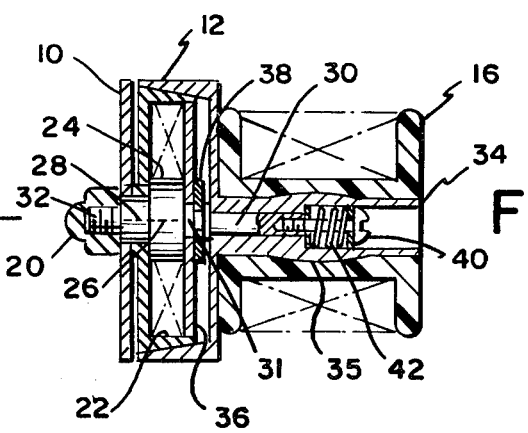
FIG. 2 shows a section through the clutch, thread spool and frame of the fly tying bobbin.

Referring to the drawings, and initially to FIG. 1 there is seen a completely assembled fly tying bobbin having a frame 10, a clutch housing 12 mounted on frame 10, a spool 16 mounted on clutch housing 12, and a thread guide tube 14 mounted at the opposite end of frame 10. FIG. 2 shows a section through the clutch housing 12 and spool 16. Arm 34 is an integral part of clutch housing 12. Mating with the clutch housing 12 is male clutch member 22 which engages the inner surface of the clutch housing 12 on a 5° taper. Bearing shaft 24 is fixed and fastened to frame 10 by nut 20 on threaded portion 32 of bearing shaft 24. Bearing shaft 24 has several stepped surfaces namely central portion 26, bearing portion 28, threaded portion 32, arm bearing 30 and a snap ring groove 31. Bearing portion 28 passes through the hub part of male clutch member 22 which is free to rotate on said bearing portion 28. The inner end surface of male clutch member abuts the shoulder of central portion 26. Abutting the other shoulder of central portion 26 is spring retaining washer 36 which is held in place by snapping 38 in groove 31. Arm 34 of clutch housing 12 rotates about arm bearing 30. Clutch housing 12 is urged towards male clutch member 22 by spring 42. Spring 42 is mounted in arm 34 by means of screw 40 and two flat spring retainers at either end of spring 42. The threaded portion of screw 40 is engaged with a threaded portion located centrally and midway along the length of arm 34. The hollow portion of arm 34 is slotted, not shown, so that it will contract when spool 16 is slipped on the arm 34 and is held in place when arm 34 relaxes after the spool 16 is in place and held there by the slight bulge 35 on arm 34. Centrally located in the male clutch member 22 is a slip ring 44 and flat spring 46. This can be seen in FIG. 3. Slip ring 44 is a narrow piece of spring steel which prestressed to fit snugly against the inner circumference of male clutch member 22. The slip ring 44 covers about 345° of the inner circumference of male clutch member 22. One end of slip ring 44 is bent so that one end of a flat spring 46 is anchored to this bent portion. The other end of flat spring 46 is anchored to a slot in central portion 26 of bearing shaft 24.

The operation of the retractible fly tying bobbin is as follows. As the thread 18 is dispensed from spool 16 by pulling the thread 18, spool 16 will rotate counterclockwise. As spool 16 rotates counterclockwise it will cause clutch housing 12, on which spool 16 tightly fits on arm 34, to also rotate counterclockwise. Rotation of clutch housing 12 also causes male clutch member 22 to rotate counterclockwise due to wedge fit of clutch member 22 in clutch housing 12. This in turn causes slip ring 44 to rotate counterclockwise, thereby causing flat spring 46 to wind up since one end of flat spring 46 is attached to the rotating slip ring 44 and the other end is attached to the central portion 26 of bearing shaft 24 which is fixed. The wind up of flat spring 46 applies a force opposite to the pull dispensing thread 18, thereby keeping the thread 18 in tension. If the end of thread 18 is let loose it will retract on to spool 16. If the end of thread 18 is wound on a fly which is firmly held, then the thread 18 will remain taught until the tension is relieved. Tension is relieved by pulling clutch housing 12 away from male clutch member 22 against the force of spring 42. This will relieve the thread force on male clutch member 22 thereby allowing the flat spring 46 and male clutch member 22 to unwind. When clutch housing 12 is released it will be urged back on male clutch member 22 by the force of spring 42. Tension on the bobbin is now relieved. It should be noted that tension can be varied by prestressing the slip ring 44. If you wish to have more tension you spread apart slip ring 44 before inserting it in male clutch housing 22. For less tension you press the ends of slip ring 44 closer together, before inserting it in the male clutch housing 22. The prestressing of slip ring 44 determines the force which slip ring 44 will exert normal to the inner cicumferencial surfaces of male clutch member 22. This in turn will also determine the force needed to overcome the frictional force keeping slip ring 44 from slipping along male clutch member 22. The tension should be set slightly less than the breaking stress of the thread 18 then if this tension is exceeded in the thread 18, it will cause slip ring 44 to slip without breaking thread 18.

Figure 4:
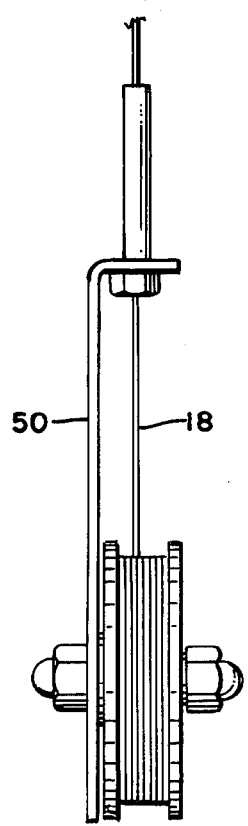
FIG. 4 shows an alternate design wherein the thread spool is an integral part of the clutch housing.

Another embodiment of my invention is shown in FIG. 4 where the thread 18 is wound directly on the clutch housing thereby giving a more compact bobbin with a straight frame 50. However it is not as easy to change threads as it is in my preferred embodiment which uses a separate spool.

Having thus described my invention and advantages thereof, it will be understood that the foregoing disclosure relates not only to preferred embodiments of the invention, but it is also intended to cover all changes and modifications of the invention selected for the purpose of disclosure without departing from the true spirit and scope thereof.

I claim:

1. A fly tying bobbin comprising a frame, a housing rotatably mounted on a shaft which is fixed to said frame and is comprised of two cupped shaped cylindrical halves wherein one half is driven having the outside diameter of its cylindrical section slope inwardly from its base and the other half is the driver having the inside diameter of its cylindrical section slope outwardly from its base, a thread reel affixed to said housing, a tubular guide fixedly mounted on said frame which is axially perpendicular to the axis of the thread reel, means located in said housing for keeping tension on thread being dispensed from said thread reel, and means for quickly relieving all the thread tension when desired.

2. A fly tying bobbin of claim 1 wherein the two cupped shaped cylindrical halves are a drive fit and snugly engage each other along the sloping cylindrical surfaces of each half and are kept engaged by spring biasing means.

3. A fly tying bobbin of claim 2 wherein the sloping cylindrical surfaces of each half forms a wedge having an angle of 5 degrees.

4. A fly tying bobbin of claim 1 wherein the means for keeping tension on the thread consists of a spring which is anchored at one end to a flexible spring steel member which rotates with said housing and at the other end anchored to the shaft affixed to said frame whereby the rotation of the housing causes the spring to exert a force opposing rotation of said housing.

5. A fly tying bobbin of claim 4 wherein the amount of flexing the flexible spring steel member prior to insertion in the housing establishes the maximum tension exertible on the thread.

6. A fly tying bobbin of claim 5 wherein a flexible spring steel member engages the inner surface of said housing and exerts a force against said inner surface of said housing.

7. A fly tying bobbin of claim 6 wherein the means for relieving the thread tension is the disengagement of the driver from the driven half by pulling the driver axially away from the driven half against the spring biasing means.

* * * * *